(12) United States Patent
Park et al.

(10) Patent No.: US 8,941,971 B2
(45) Date of Patent: Jan. 27, 2015

(54) MULTILAYER CERAMIC ELECTRONIC COMPONENT AND FABRICATION METHOD THEREOF

(75) Inventors: Myung Jun Park, Chungcheongbuk-do (KR); Kyu Ha Lee, Gyunggi-do (KR); Da Young Choi, Gyunggi-do (KR); Chang Hoon Kim, Gyunggi-do (KR); Hyun Hee Gu, Gyunggi-do (KR); Jae Young Park, Seoul (KR); Sang Hoon Kwon, Gyunggi-do (KR); Byung Jun Jeon, Seoul (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 100 days.

(21) Appl. No.: 13/569,703

(22) Filed: Aug. 8, 2012

(65) Prior Publication Data

US 2013/0135788 A1 May 30, 2013

(30) Foreign Application Priority Data

Nov. 30, 2011 (KR) .......................... 10-2011-0126594

(51) Int. Cl.
*H01G 4/30* (2006.01)
(52) U.S. Cl.
USPC ....................................................... 361/301.4
(58) Field of Classification Search
USPC .................................. 361/301.4, 309, 306.3
See application file for complete search history.

(56) References Cited

U.S. PATENT DOCUMENTS

| | | | | |
|---|---|---|---|---|
| 6,124,769 A * | 9/2000 | Igarashi et al. | ............... | 333/172 |
| 2009/0135543 A1 | 5/2009 | Togashi et al. | | |
| 2009/0190285 A1 * | 7/2009 | Kusano et al. | ............. | 361/321.4 |
| 2009/0268372 A1 * | 10/2009 | Ogawa et al. | ............... | 361/306.3 |
| 2011/0157767 A1 * | 6/2011 | Hur et al. | ...................... | 361/305 |

FOREIGN PATENT DOCUMENTS

| | | |
|---|---|---|
| JP | 2004-128328 A | 4/2004 |
| JP | 2004-296936 A | 10/2004 |
| JP | 2006-332284 A | 12/2006 |
| JP | 2009-27101 A | 2/2009 |
| JP | 2009-130219 A | 6/2009 |
| JP | 2011-108875 A | 6/2011 |
| JP | 2011-187225 A | 9/2011 |
| KR | 10-2009-0042850 A | 4/2009 |

OTHER PUBLICATIONS

Japanese Office Action issued in Japanese Application No. 2012-169574 dated May 20, 2014, w/English translation.

* cited by examiner

*Primary Examiner* — Jenny L Wagner
*Assistant Examiner* — Michael P McFadden
(74) *Attorney, Agent, or Firm* — McDermott Will & Emery LLP

(57) ABSTRACT

There are provided a multilayer ceramic electronic component comprising: a ceramic main body including a dielectric layer and having first and second main faces, third and fourth side faces opposed in a length direction, and fifth and sixth faces opposed in a width direction; first and second internal electrodes; and one or more first external electrodes formed on the fifth face and one or more second external electrodes formed on the sixth face, wherein the first and second external electrodes have an average thickness ranging from 3 μm to 30 μm, and when at least one of the first and second external electrodes is divided into three equal parts in a thickness direction, an area of glass in central area portions thereof is 35% to 80% of the total areas of the central area portions.

9 Claims, 5 Drawing Sheets

MULTILAYER CERAMIC ELECTRONIC COMPONENT AND FABRICATION METHOD THEREOF

CROSS-REFERENCE TO RELATED APPLICATIONS

This application claims the priority of Korean Patent Application No. 10-2011-0126594 filed on Nov. 30, 2011, in the Korean Intellectual Property Office, the disclosure of which is incorporated herein by reference.

BACKGROUND OF THE INVENTION

1. Field of the Invention

The present invention relates to a multilayer ceramic electronic component having improved reliability through enhanced chip air-tightness.

2. Description of the Related Art

Recently, as electronic products have been reduced in size, a multilayer ceramic electronic component has also required to be reduced in size, yet have a large capacity.

In line with the requirements for a multilayer ceramic electronic component to have small size and large capacity, an external electrode of the multilayer ceramic electronic component has also become thinner.

An external electrode paste may have a conductive metal such as copper (Cu) as a main material thereof to guarantee chip air-tightness and electrical connectivity with a chip and may have glass as an auxiliary material to fill voids when the metal is sintered to be contracted and provide bonding force between an external electrode and the chip.

However, in the case that the content of glass in the external electrode paste is insufficient, chip air-tightness may be defective. If excessive glass is added to compensate for this defect, the glass may be eluted (or extracted) from the surface to result in defective plating properties.

In particular, as the external electrode has become thinner, it has become difficult to implement a desired level of compactness (or denseness) therein, and the possibility of a defective product may be increased due to a shortage or excess of glass in terms of the high temperature behavior characteristics thereof.

In addition, in the case of a small multilayer ceramic electronic component of which an external electrode applied thereto is thin, since the thickness of the external electrode in a corner portion may be excessively reduced, corner coverage may deteriorate, allowing a plating solution to infiltrate thereinto.

SUMMARY OF THE INVENTION

An aspect of the present invention provides a multilayer ceramic electronic component having improved reliability through enhancing chip air-tightness.

According to an aspect of the present invention, there is provided a multilayer ceramic electronic component including: a ceramic main body including a dielectric layer and having first and second main faces opposed in a lamination direction of the dielectric layer, third and fourth side faces connecting the first and second main faces and opposed in a length direction, and fifth and sixth faces connecting the first and second main faces and opposed in a width direction; first and second internal electrodes disposed to face each other, while having the dielectric layer interposed therebetween within the ceramic main body; and one or more first external electrodes formed on the fifth face and electrically connected to the first internal electrodes and one or more second external electrodes formed on the sixth face and electrically connected to the second internal electrodes, wherein the first and second external electrodes include a conductive metal and glass and have an average thickness ranging from 3 μm to 30 μm, and when at least one of the first and second external electrodes is divided into three equal parts in a thickness direction, an area of glass in central area portions thereof is 35% to 80% of the total areas of the central area portions.

The ratio of the content of glass to that of the conductive metal may range from 0.4 to 2.0.

The first and second external electrodes may be formed through an application of a paste including 10 to 90 parts by weight of conductive metal particles having an average particle diameter of 0.3 μm or less.

The conductive metal may be one or more selected from a group consisting of copper (Cu), nickel (Ni), silver (Ag), and silver-palladium (Ag—Pd).

The first and second external electrodes may extend onto the first and second main faces, respectively.

Two first external electrodes and two second external electrodes may be provided, and the first and second external electrodes may be four or more multiple terminals.

The first and second external electrodes may be three terminals including a single first external electrode, a single second external electrode, and third external electrodes formed to face each other on the third and fourth side faces.

An average thickness of the first and second external electrodes may be 5 μm or more.

The glass included in the first and second external electrodes may be an insulating glass.

According to another aspect of the present invention, there is provided a multilayer ceramic electronic component including: a ceramic main body including a dielectric layer and having first and second main faces opposed in a lamination direction of the dielectric layer, third and fourth side faces connecting the first and second main faces and opposed in a length direction, and fifth and sixth faces connecting the first and second main faces and opposed in a width direction; first and second internal electrodes disposed to face each other, while having the dielectric layer interposed therebetween within the ceramic main body; and one or more first external electrodes formed on the fifth face and electrically connected to the first internal electrodes and one or more second external electrodes formed on the sixth face and electrically connected to the second internal electrodes, wherein the first and second external electrodes include a conductive metal and glass, the ratio of the glass content to that of the conductive metal ranges from 0.4 to 2.0, and the first and second external electrodes are formed through an application of a paste including 10 to 90 parts by weight of conductive metal particles having an average particle diameter of 0.3 μm or less.

When at least one of the first and second external electrodes is divided into three equal parts in a thickness direction, an area of glass in central area portions thereof may be 35% to 80% of the total areas of the central area portions.

The conductive metal may be one or more selected from a group consisting of copper (Cu), nickel (Ni), silver (Ag), and silver-palladium (Ag—Pd).

The first and second external electrodes may extend onto the first and second main faces, respectively.

Two first external electrodes and two second external electrodes may be provided, and the external electrodes may be four or more multiple terminals.

The first and second external electrodes may be three terminals including a single first external electrode, a single second external electrode, and third external electrodes formed to face each other on the third and fourth side faces.

An average thickness of the first and second external electrodes may be 5 μm or more.

The glass included in the first and second external electrodes may be an insulating glass.

According to another aspect of the present invention, there is provided a method of fabricating a multilayer ceramic electronic component, including: preparing a ceramic main body including dielectric layers and first and second internal electrodes disposed to face each other, while having dielectric layers interposed therebetween, and having first and second main faces opposed in a lamination direction of the dielectric layer, third and fourth side faces connecting the first and second main faces and opposed in a length direction, and fifth and sixth faces connecting the first and second main faces and opposed in a width direction; preparing an external electrode paste including a conductive metal including 10 to 90 parts by weight of conductive metal particles having an average particle diameter of 0.3 μm or less and glass whose ratio of content to that of the conductive metal ranges from 0.4 to 2.0; applying the external electrode paste to the ceramic main body so as to be electrically connected to the first and second internal electrodes; and firing the ceramic main body to form first and second external electrodes, wherein one or more first external electrodes are formed on the fifth face and electrically connected to the first inner electrodes and one or more second external electrodes are formed on the sixth face and electrically connected to the second inner electrodes.

When at least one of the first and second external electrodes is divided into three equal parts in a thickness direction, an area of glass in central area portions thereof may be 35% to 80% of the total areas of the central area portions.

The conductive metal may be one or more selected from a group consisting of copper (Cu), nickel (Ni), silver (Ag), and silver-palladium (Ag—Pd).

The first and second external electrodes may extend onto the first and second main faces, respectively.

Two first external electrodes and two second external electrodes may be provided, and the external electrodes may be four or more multiple terminals.

The first and second external electrodes may be three terminals including a single first external electrode, a single second external electrode, and third external electrodes formed to face each other on the third and fourth side faces.

The glass included in the first and second external electrodes may be an insulating glass.

The firing of the ceramic main body may be performed at 750° C. or lower.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
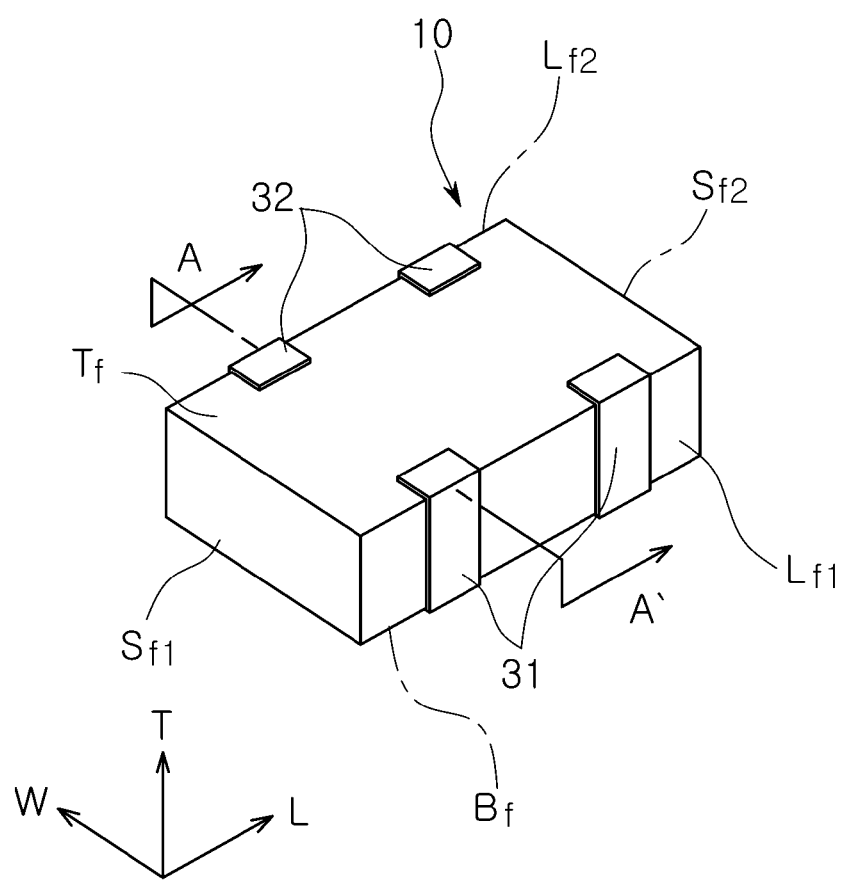
FIG. 1 is a schematic perspective view of a multilayer ceramic capacitor (MLCC) according to an embodiment of the present invention.

The invention may be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

Embodiments of the present invention will now be described in detail with reference to the accompanying drawings.

FIG. 1 is a schematic perspective view of a multilayer ceramic capacitor (MLCC) according to an embodiment of the present invention.

Figure 2:
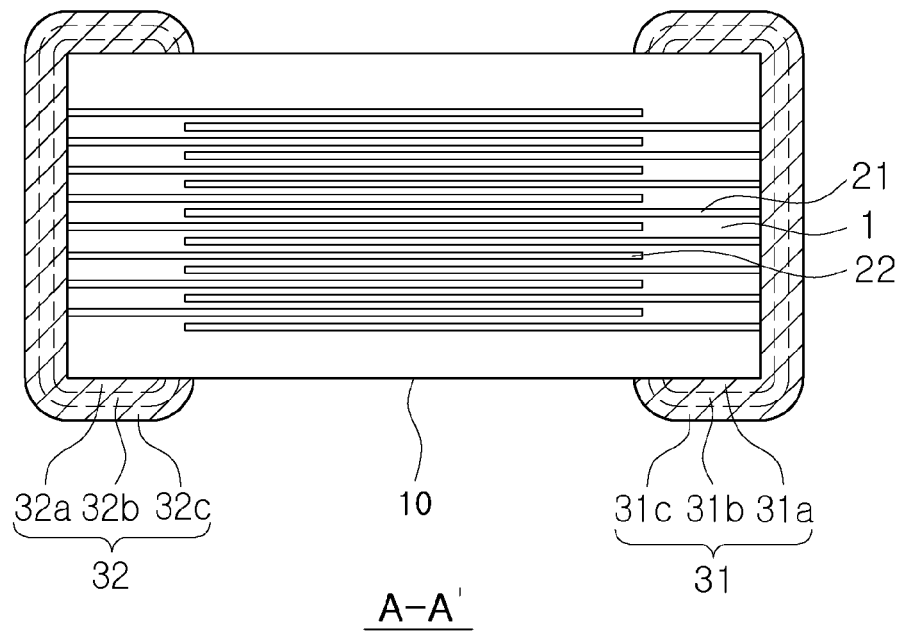
FIG. 2 is a cross-sectional view of the MLCC, taken along line A-A' in FIG. 1.

FIG. 2 is a cross-sectional view of the MLCC, taken along line A-A' in FIG. 1.

With reference to FIGS. 1 and 2, the multilayer ceramic electronic component according to an embodiment of the present invention may include: a ceramic main body 10 including a dielectric layer 1 and having first and second main faces opposed in a lamination direction of the dielectric layer 1, third and fourth side faces connecting the first and second main faces and opposed in a length direction, and fifth and sixth faces connecting the first and second main faces and opposed in a width direction; first and second internal electrodes 21 and 22 disposed to face each other, while having the dielectric layer 1 interposed therebetween within the ceramic main body 10; and one or more first external electrodes 31 formed on the fifth face and electrically connected to the first internal electrodes 21 and one or more second external electrodes 32 formed on the sixth face and electrically connected to the second internal electrodes 22, wherein the first and second external electrodes 31 and 32 include a conductive metal and glass and have an average thickness ranging from 3 μm to 30 μm, and when at least one of the first and second external electrodes is divided into three equal parts in a thickness direction, an area of glass in central area portions thereof is 35% to 80% of the total areas of the central area portions.

Hereinafter, the multilayer ceramic electronic component according to an embodiment of the present invention will be described, and in this case, a multilayer ceramic capacitor (MLCC) will be taken as an example of the multilayer ceramic electronic component, but the present invention is not limited thereto.

The ceramic main body 10 may have a rectangular parallelepiped shape. In the present embodiment, it is defined that faces in a lamination direction are a first main face Tf and a second main face Bf, respectively, faces in a length direction are a third side face Sf1 and a fourth side face Sf2, respectively, and faces in the width direction are a fifth section Lf1 and a sixth section Lf2, respectively.

In the multilayer ceramic capacitor (MLCC) according to an embodiment of the present invention, it is defined that a 'length direction' is the 'L' direction, a 'width direction' is the 'W' direction, and a 'thickness direction' is the 'T' direction in FIG. 1. Here, the 'thickness direction' may be used to have the same concept as a 'lamination direction' in which dielectric layers are stacked.

According to an embodiment of the present invention, a raw material for forming the dielectric layer 1 is not particularly limited so long as sufficient capacitance may be obtained. For example, the raw material of the dielectric layer 1 may be powder such as barium titanate ($BaTiO_3$).

As for the material of the dielectric layer 1, various materials such as a ceramic additive, an organic solvent, a plasticizer, a bonding agent, a dispersing agent, or the like, may be added to the powder such as barium titanate ($BaTiO_3$) powder, or the like, according to the purpose of the present invention.

A material for forming the first and second internal electrodes 21 and 22 may not be particularly limited. For example, the first and second internal electrodes 21 and 22 may be formed by using a conductive paste made of a material of one or more among silver (Ag), lead (Pb), platinum (Pt), nickel (Ni), and copper (Cu).

The MLCC according to an embodiment of the present invention may include the first external electrodes 31 electrically connected to the first internal electrodes 21 and the second external electrodes 32 electrically connected to the second internal electrodes 22.

The first and second external electrodes 31 and 32 may be electrically connected to the first and second internal electrodes 21 and 22, respectively, so as to form capacitance, and the second external electrodes 32 may be connected to a potential different from that of the first external electrodes 31.

The first external electrodes 31 may be formed on the fifth face Lf1, and the second external electrodes 32 may be formed on the sixth face Lf2.

The number of the first and second external electrodes 31 and 32 is not limited. For example, one or more first and second external electrodes 31 and 32 may be provided.

In particular, with reference to FIG. 1, the MLCC according to an embodiment of the present invention may include two first external electrodes 31 and two second external electrodes 32, respectively.

Also, the first and second external electrodes 31 and 32 may extend onto the first main face Tf and the second main face Bf, respectively, but the present invention is not limited thereto.

An average thickness of the first and second external electrodes 31 and 32 is not particularly limited. For example, the average thickness of the first and second external electrodes 31 and 32 may range from 3 μm to 30 μm.

If the average thickness of the first and second external electrodes 31 and 32 is less than 3 μm, a plating solution could possibly infiltrate therethrough to result in a defective product, and if the average thickness of the first and second external electrodes 31 and 32 exceeds 30 μm, the first and second external electrodes would be too thick to allow for thin external electrodes, resulting in a failure to achieve the purpose of the present invention.

In particular, in the MLCC according to an embodiment of the present invention, the average thickness of the first and second external electrodes 31 and 32 may be 5 μm or more. If the average thickness of the first and second external electrodes 31 and 32 is less than 5 μm, the external electrodes would be too thin, allowing a plating solution to infiltrate thereinto, resulting in a defective product.

According to an embodiment of the present invention, the first and second external electrodes 31 and 32 include a conductive metal and glass, and when at least one of the first and second external electrodes 31 and 32 is divided into three equal parts in a thickness direction, an area of glass in central area portions thereof is 35% to 80% of the total areas of the central area portions.

The conductive metal may be, for example, one or more selected from the group consisting of copper (Cu), nickel (Ni), silver (Ag), and silver-palladium (Pd), but the present invention is not limited thereto.

The position in which the area of the glass is measured may be, for example, the central area portions 31b and 32b when the first and second external electrodes 31 and 32 are divided into three equal parts in the thickness direction, but the present invention is not particularly limited thereto.

Here, the thickness of the first and second external electrodes may refer to the height of the first and second external electrodes at both end portions of the ceramic main body 10 in the length direction, and the height of the first and second external electrodes from an upper surface to a lower surface or from a lower surface to upper surface of the ceramic main body 10 in the thickness direction.

The measurement of the area of the glass is not particularly limited. However, for example, a size of the area of the glass in the areas of 150 μm×10 μm (width×length) at the central area portions 31b and 32b with respect to the total areas of 150 μm×10 μm (width×length) at the central area portions 31b and 32b may be measured.

For example, when the first and second external electrodes 31 and 32 are divided into three equal parts in the thickness direction, the area of the glass in the central area portions 31b and 32b in comparison with the total areas of the central area portions 31b and 32b may be measured by scanning an image of a cross section of the MLCC in the length direction thereof by using a scanning electron microscope (SEM) as shown in FIG. 2.

In detail, with respect to an external electrode area extracted by scanning an image of a cross section of the MLCC, with a SEM, in a length and thickness direction (L-T) cut at the central portion thereof in the width (W) direction as shown in FIG. 2, the area of the glass in the external electrode cross-section in comparison with the total area of the external electrode cross-section may be measured.

Since the area occupied by the glass satisfies 35% to 80%, even though the content of the glass is extremely increased to cause the thinning of the external electrodes, the ceramic main body 10 may have excellent air-tightness.

Specifically, the glass may accelerate sintering of the conductive metal and serve as an adhesive between the ceramic main body 10 and the external electrodes, and in particular, voids not filled with the conductive metal may be filled with the glass to implement chip air-tightness.

According to an embodiment of the present invention, since the area of the glass included in the first and second external electrodes 31 and 32 is extremely increased, the ceramic main body 10 may have excellent air-tightness.

Accordingly, high temperature insulation resistance (IR) characteristics of the MLCC according to an embodiment of the present invention may be improved to allow for reliability.

Also, in accordance with the thinning of the external electrodes, the thickness of the corner portions of the external electrodes is reduced to deteriorate compactness, allowing a plating solution to infiltrate into the ceramic main body.

However, according to an embodiment of the present invention, even though the thickness of the corner portions of the external electrodes is reduced, since the area occupied by the glass is increased, the compactness of the corner portions may be enhanced, thereby preventing a degradation in reliability due to the infiltration of the plating solution.

When the area occupied by the glass is less than 35%, since the content of the glass is small, the air-tightness of the ceramic main body according to the embodiment of the present invention may not be obtained.

Also, when the area occupied by the glass exceeds 80%, the conductive metal is transferred due to the excessive content of the glass, thereby allowing the corner portions of the external electrodes to be broken, and leading to an increase in defective non-plating due to glass elution or a degradation of capacitor contact due to a degradation of connection between internal electrodes and external electrodes.

Here, as for the determination of reliability, when evaluation is made at a rated voltage (or a voltage higher than the rated voltage) under conditions of high temperature and high humidity, the evaluation may be made by changing the rated voltage under the high temperature condition, and in the chip such as the capacitor as an insulator, the reliability may be measured based on a change in an insulation resistance value. When a defect such as a crack, or the like, is generated, the insulation resistance value is increased to cause a defect.

Also, defective non-plating may be determined by immersing the multilayer ceramic capacitor in a solder pot able to melt tin (Sn), removing it from the solder pot, and then, observing a portion from which the tin layer was removed and in which a nickel-plated layer was not formed. Besides, defective non-plating may be also be determined by using an X-ray fluorescence spectroscopy (XRF).

The capacitor contact is a criterion for determining connectivity between the internal electrodes and the external electrodes. Every multilayer ceramic capacitor has a rated capacity, and here, when connectivity between the internal electrodes and the external electrodes is degraded, the capacity may be lower than the rated capacity, based on which connectivity can be determined. In general, when a great amount of glass, a nonconductive substance, is included, connectivity between the internal electrodes and the external electrodes may be hampered.

According to an embodiment of the present invention, the ratio of the content of the glass to that of the conductive metal may range from 0.4 to 2.0, but the present invention is not particularly limited thereto.

Since the first and second external electrodes 31 and 32 include glass whose ratio of content to that of the conductive metal ranges from 0.4 to 2.0, even though the content of the glass is extremely increased to cause the thinning of the external electrodes, the ceramic main body 10 may have excellent air-tightness.

Thus, high temperature insulation resistance (IR) characteristics of the MLCC according to an embodiment of the present invention may be improved to allow for the obtainment of reliability.

Also, even though the thickness of the corner portions of the external electrodes is reduced, since the content of the glass is increased, the compactness of the corner portions may be enhanced, thereby preventing a degradation in reliability due to the infiltration of the plating solution.

When the content of the glass over that of the conductive metal is less than 0.4, since the content of the glass is small, the air-tightness of the ceramic main body according to the embodiment of the present invention may not be obtained to cause degradation of reliability.

Also, when the content of the glass over that of the conductive metal exceeds 2.0, the conductive metal is transferred due to the excessive content of the glass, thereby allowing the corner portions of the external electrodes to be broken, and leading to an increase in defective non-plating due to glass elution or a degradation of capacitor contact due to a degradation of connection between internal electrodes and external electrodes.

The first and second external electrodes 31 and 32 may be formed through the application of a paste including to 90 parts by weight of conductive metal particles having an average particle diameter of 0.3 µm or less, but the present invention is not particularly limited thereto.

According to an embodiment of the present invention, in order to prevent connection defects between the external electrodes and the internal electrodes due to the increased content of glass included in the first and second external electrodes 31 and 32, the first and second external electrodes 31 and 32 may be formed through the application of the paste including metal particles having different sizes.

Since the first and second external electrodes 31 and 32 are formed through the application of the paste including 10 to 90 parts by weight of the conductive metal particles having an average particle diameter of 0.3 µm or less, even though the content of the glass is increased, degradation in reliability may not caused.

Also, the paste may include 10 to 90 parts by weight of conductive metal particles having an average particle diameter of 1.0 µm or more, but the average particle diameter of the conductive particles and the content are not particularly limited.

In detail, since 10 to 90 parts by weight of the conductive metal particles having an average particle diameter of 0.3 µm or less may be contained in the paste, a copper-nickel (Cu—Ni) alloy may be formed before the softening of the glass in the process of firing the external electrodes.

Thus, even though the first and second external electrodes 31 and 32 include the increased content of glass according to an embodiment of the present invention, connection defects may not be generated between the external electrodes and the internal electrodes.

When less than 10 parts by weight of the conductive metal particles having the average particle diameter of 0.3 µm or smaller are contained, a speed at which the glass is softened to be transferred to an interface may be increased, as compared with a speed at which a temperature, at which the alloy between the metal powder of the external electrodes and the internal electrodes is formed, is reached, thereby causing connection defects between the external electrodes and the internal electrodes.

Also, when greater than 90 parts by weight of the metal particles having the average particle diameter of 0.3 µm or less are contained, the metal powder having the average particle diameter of 0.3 µm or less may be excessively sintered to cause the glass to elute from the surface, whereby defective plating and defective chip bonding may be generated.

The glass included in the first and second external electrodes 31 and 32 may be an insulating glass, but the present invention is not limited thereto.

Figure 3:
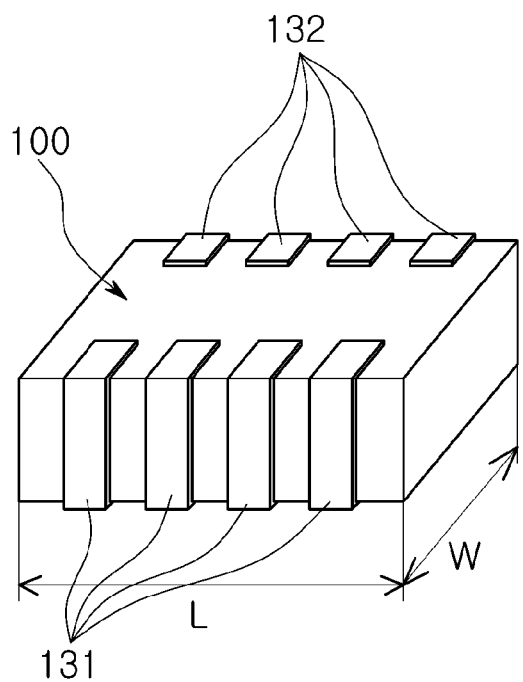
FIG. 3 is a schematic perspective view of a multilayer ceramic capacitor (MLCC) according to another embodiment of the present invention.

FIG. 3 is a schematic perspective view of a multilayer ceramic capacitor (MLCC) according to another embodiment of the present invention.

Figure 4:
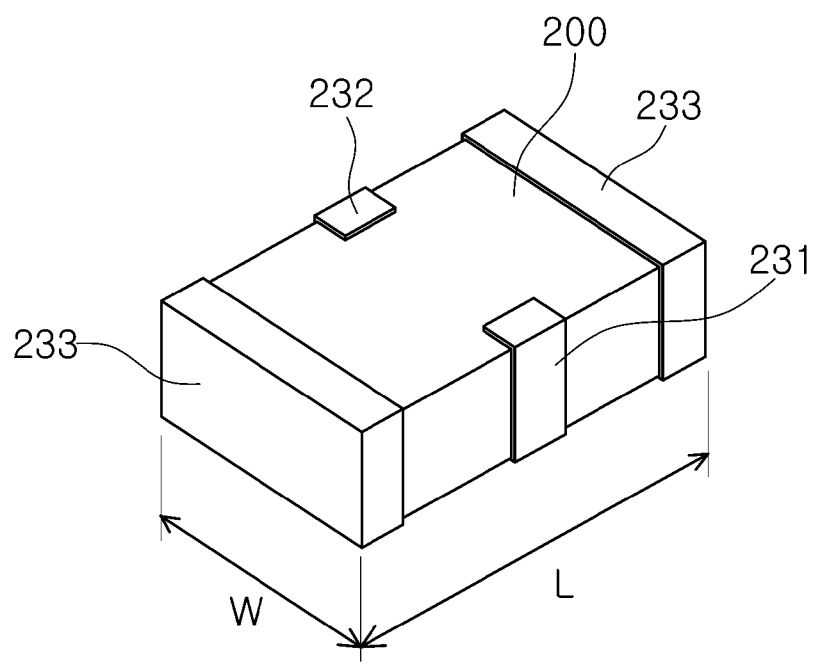
FIG. 4 is a schematic perspective view of a multilayer ceramic capacitor (MLCC) according to another embodiment of the present invention.

FIG. 4 is a schematic perspective view of a multilayer ceramic capacitor (MLCC) according to another embodiment of the present invention.

With reference to FIG. 3, the MLCC according to another embodiment of the present invention may be a multi-terminal capacitor in which the first and second external electrodes 131 and 132 are formed on the fifth and sixth faces Lf1 and Lf2, i.e., the faces of the ceramic main body 100 in the width direction, respectively, but the present invention is not limited thereto.

In particular, FIG. 3 shows an MLCC including four first external outer electrodes 131 and four second external electrodes 132.

With reference to FIG. 4, the MLCC according to another embodiment of the present invention may be a three-terminal capacitor in which a single first external electrode 231 and second external electrodes 232 are formed on the fifth and sixth faces Lf1 and Lf2, i.e., the faces of a ceramic main body 200 in the width direction, respectively, and third external electrodes 233 are formed to face each other on the third and fourth side faces Sf1 and Sf2, i.e., the faces of the ceramic main body 200 in the length direction, respectively, but the present invention is not limited thereto.

A multilayer ceramic electronic component according to another embodiment of the present invention may include: a ceramic main body 10 including a dielectric layer 1 and having first and second main faces opposed in a lamination direction of the dielectric layer 1, third and fourth side faces connecting the first and second main faces and opposed in a length direction, and fifth and sixth faces connecting the first and second main faces and opposed in a width direction; first and second internal electrodes 21 and 22 disposed to face each other, while having the dielectric layer 1 interposed therebetween within the ceramic main body 10; and one or more first external electrodes 31 formed on the fifth face and electrically connected to the first internal electrodes 21 and one or more second external electrodes 32 formed on the sixth face and electrically connected to the second internal electrodes 22, wherein the first and second external electrodes 31 and 32 include a conductive metal and glass, the ratio of the content of the glass to that of the conductive metal ranges from 0.4 to 2.0, and the first and second external electrodes 31 and 32 are formed through an application of a paste including 10 to 90 parts by weight of conductive metal particles having an average particle diameter of 0.3 μm or less.

When at least one of the first and second external electrodes 31 and 32 is divided into three equal parts in a thickness direction, an area of the glass in central area portions thereof may be 35% to 80% of the total areas of the central area portions.

The conductive metal may be one or more selected from a group consisting of copper (Cu), nickel (Ni), silver (Ag), and silver-palladium (Ag—Pd).

The first and second external electrodes 31 and 32 may extend onto the first main face Tf and the second main face Bf, respectively.

Two first external electrodes 31 and two second external electrodes 32 may be provided, and the external electrodes may be four or more multiple terminals. In particular, the external electrodes may be three terminals including a single first external electrode, a single second external electrode, and third external electrodes formed to face each other on the third and fourth side faces.

An average thickness of the first and second external electrodes 31 and 32 may be 5 lam or more.

The glass included in the first and second external electrodes 31 and 32 may be an insulating glass.

A repeated description of the characteristics of the multilayer ceramic electronic component as that of the multilayer ceramic electronic component according to the foregoing embodiment will be omitted.

Figure 5:
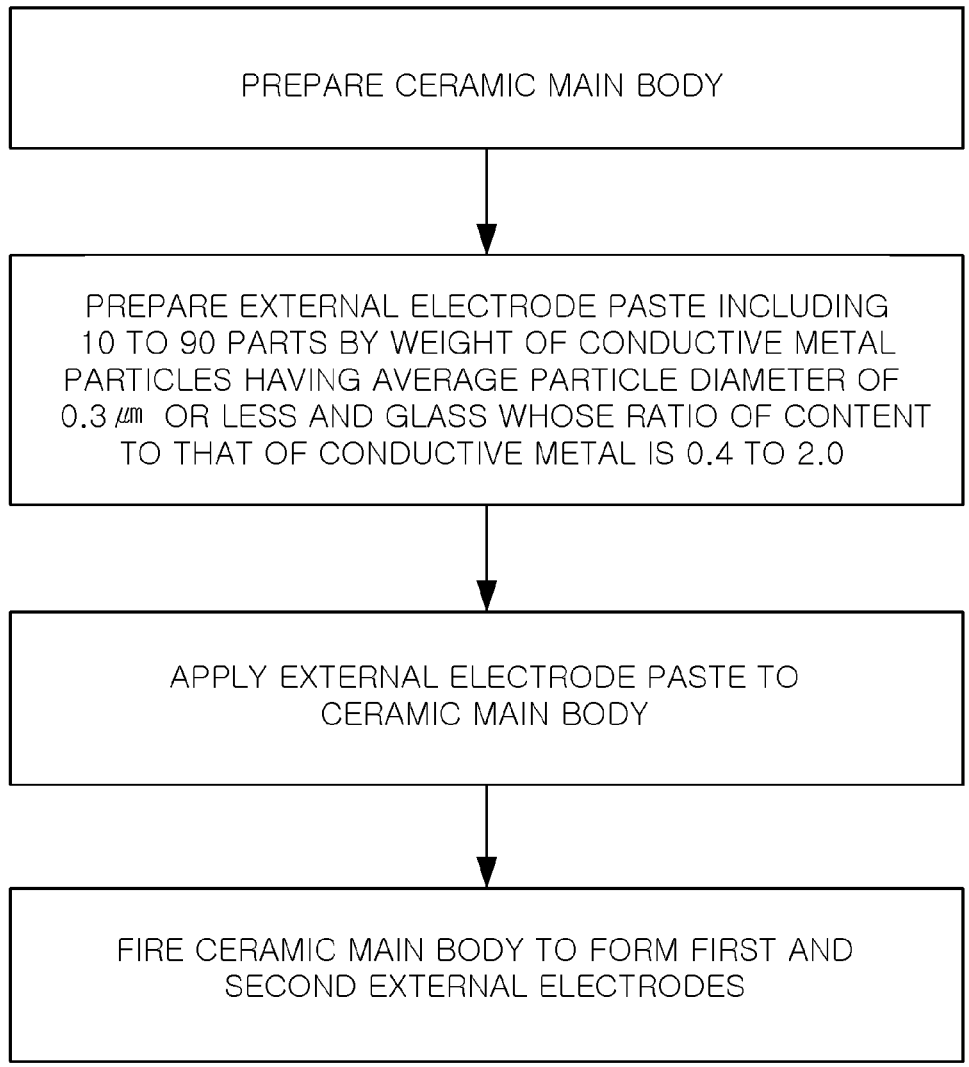
FIG. 5 is a flow chart illustrating a process of fabricating an MLCC according to another embodiment of the present invention.

FIG. 5 is a flow chart illustrating a process of fabricating an MLCC according to another embodiment of the present invention.

With reference to FIG. 5, a method of fabricating a multilayer ceramic electronic component according to another embodiment of the present invention may include: preparing a ceramic main body including dielectric layers and first and second internal electrodes disposed to face each other, while having dielectric layers interposed therebetween, and having first and second main faces opposed in a lamination direction of the dielectric layer, third and fourth side faces connecting the first and second main faces and opposed in a length direction, and fifth and sixth faces connecting the first and second main faces and opposed in a width direction; preparing an external electrode paste including a conductive metal including 10 to 90 parts by weight of conductive metal particles having an average particle diameter of 0.3 μm or less and glass whose ratio of content to that of the conductive metal ranges from 0.4 to 2.0; applying the external electrode paste to the ceramic main body so as to be electrically connected to the first and second internal electrodes; and firing the ceramic main body to form first and second external electrodes, wherein one or more first external electrodes are formed on the fifth face and electrically connected to the first inner electrodes and one or more second external electrodes are formed on the sixth face and electrically connected to the second inner electrodes.

In describing the method of fabricating a multilayer ceramic electronic component according to another embodiment of the present invention, a repeated description with respect to the multilayer ceramic electronic component according to the foregoing embodiment of the present invention will be omitted.

Hereinafter, the method of fabricating a multilayer ceramic electronic component according to another embodiment of the present invention will be described in detail by taking a multilayer ceramic capacitor (MLCC) as an example, but the present invention is not limited thereto.

First, the ceramic main body 10 including the dielectric layers 1 and the first and second internal electrodes 21 and 22 disposed to face each other while having dielectric layers 1 interposed therebetween.

The dielectric layers 1 may be formed as ceramic green sheets, and in this case, each ceramic green sheet is fabricated as follows. Powder such as barium titanate ($BaTiO_3$) powder, or the like, is mixed with a ceramic additive, an organic solvent, a plasticizer, a bonding agent, and a dispersing agent by using a basket mill to form a slurry, and the slurry is applied to a carrier film and then dried to form respective ceramic green sheets having a thickness of several micrometers (μm).

A conductive paste is dispensed onto the ceramic green sheet and a squeegee applies the conductive paste in a single direction, to thereby form an internal electrode layer.

Here, the conductive paste may be made of one of a precious metal such as silver (Ag), lead (Pb), platinum (Pt), or the like, and a metal such as nickel (Ni) or copper (Cu), or a combination of at least two or more thereof.

In this manner, after the internal electrode layer is formed, the ceramic green sheet is separated from the carrier film, and a plurality of the ceramic green sheets may be laminated to form a green sheet lamination.

Next, the green sheet lamination is compressed at a high temperature and pressure and then the compressed green sheet lamination is cut to a predetermined size through a cutting process, thus fabricating a ceramic main body.

Thereafter, an external electrode paste including a conductive metal including 10 to 90 parts by weight of conductive metal particles having an average particle diameter of 0.3 μm or less and glass whose ratio of content to that of the conductive metal ranges 0.4 to 2.0 may be prepared.

The external electrode paste may include 10 to 90 parts by weight of the conductive metal particles having an average particle diameter of 1.0 μm or more.

The conductive metal may be one or more selected from the group consisting of copper (Cu), nickel (Ni), silver (Ag), and silver-palladium (Ag—Pd).

Thereafter, the external electrode paste may be applied to the ceramic main body 10 so as to be electrically connected to the first and second internal electrodes 21 and 22.

Finally, the ceramic main body 10 may be fired to form the first and second external electrodes 31 and 32.

One or more first external electrodes may be formed on the fifth face and electrically connected to the first inner electrodes, and one or more second external electrodes may be formed on the sixth face and electrically connected to the second inner electrodes.

Two first external electrodes 31 and two second external electrodes 32 may be provided, and the external electrodes may be four or more multiple terminals. In particular, the external electrodes may be three terminals including a single first external electrode, a single second external electrode, and third external electrodes formed to face each other on the third and fourth side faces.

The firing of the ceramic main body 10 may be performed at a temperature of 750° C. or lower.

According to the embodiment of the present invention, even though the first and second external electrodes 31 and 32 include an increased content of glass, the ceramic main body 10 may be fired at the temperature of 750° C. or lower so as to prevent connection defects between the external electrodes and the internal electrodes.

Specifically, the external electrode paste may include 10 to 90 parts by weight of a conductive metal including conductive metal particles having an average particle diameter of 0.3 μm or less, and in order to prevent low temperature firing of the conductive metal due to the use of the fine particles, the ceramic main body 10 may be fired at a low temperature.

Thus, according to an embodiment of the present invention, a copper-nickel (Cu—Ni) alloy may be formed before the softening of the glass in the process of firing the external electrodes.

Thus, even though the first and second external electrodes 31 and 32 include the increased content of glass, defective connectivity between the external electrodes and the internal electrodes may not be generated.

Hereinafter, the present invention will be described in more detail through Embodiment Examples, but the present invention is not limited thereto.

The Embodiment Examples were performed to test electrode connectivity, defective plating, defective chip bonding, and reliability with regard to a multilayer ceramic capacitor (MLCC) including first and second external electrodes in which when the first and second external electrodes are divided into three equal parts in a thickness direction, an area of glass in central area portions thereof is 35% to 80% of the total areas of the central area portions, and the first and second external electrodes are formed by using an external electrode paste including a conductive metal including 10 to 90 parts by weight of conductive metal particles having an average particle diameter of 0.3 μm or less and glass whose ratio of content to that of the conductive metal ranges 0.4 to 2.0.

The MLCC according to the Embodiment Examples was fabricated through the following steps.

First, slurry including powder such as barium titanate (BaTiO$_3$) powder, or the like, was applied on a carrier film and then dried to prepare a plurality of ceramic green sheets, whereby dielectric layers are formed.

Next, a conductive paste for internal electrodes, including nickel particles having an average size of 0.05 to 0.2 μm, was prepared.

The conductive paste for internal electrodes was applied to the plurality of ceramic green sheets through a screen printing method in order to form internal electrodes, and fifty internal electrodes were laminated to form a lamination.

Thereafter, the lamination was compressed and cut to generate a chip having a size of 2012 standard, and the chip was fired at a temperature ranging from 1050° C. to 1200° C. under a reduced atmosphere of H$_2$ equal to or less than 0.1%.

Then, external electrodes were formed such that when the external electrodes were divided into three equal parts in a thickness direction, an area of the glass in central area portions thereof is 20% to 90% of the total areas of the central area portions, and then subjected to a process such as plating or the like, to fabricate an MLCC.

In the following Table 1, connectivity between the ceramic main body and the external electrodes, defective plating, defective chip bonding, and reliability were compared according to the content of glass over copper (Cu) metal included in the external electrodes of the MLCC.

TABLE 1

|  | Content of glass (Ratio of content to that of Cu metal) | Connectivity between ceramic main body and external electrodes | Defective plating | Defective chip bonding | Reliability (high temperature IR) |
| --- | --- | --- | --- | --- | --- |
| Comparative Example 1 | 0.3 | 0/100 | 0/200 | 2/10000 | 2/40 |
| Embodiment Example 1 | 0.4 | 0/100 | 0/200 | 0/10000 | 0/40 |
| Embodiment Example 2 | 0.7 | 0/100 | 0/200 | 0/10000 | 0/40 |
| Embodiment Example 3 | 1.0 | 0/100 | 0/200 | 0/10000 | 0/40 |
| Embodiment Example 4 | 2.0 | 0/100 | 0/200 | 0/10000 | 0/40 |
| Comparative Example 2 | 2.1 | 8/100 | 6/200 | 726/10000 | 0/40 |

With reference to Table 1, Comparative Example 1 includes glass whose ratio of content to that of copper (Cu) metal was 0.3. It can be seen that chip bonding was defective and an insulation resistance (IR) test had defects.

Also, Comparative Example 2 includes glass whose ratio of content to that of copper (Cu) metal was 2.1. It can be seen that connectivity between the ceramic main body and the external electrodes, plating, and chip bonding were defective, and the high temperature insulation resistance (IR) test had defects.

Meanwhile, Embodiment Examples 1 through 4 satisfied the range of numerical values according to the present invention. It can be seen that Embodiment Examples 1 through 4 had favorable results in the tests of connectivity between the ceramic main body and the external electrodes, defective plating, defective chip bonding, and reliability.

In the following Table 2, connectivity between the ceramic main body and the external electrodes, defective plating, defective chip bonding, and reliability were compared according to an average particle diameter of copper (Cu) metal particles.

TABLE 2

| | Average particle diameter of Copper (Cu) metal particles | | Connectivity between ceramic main body and external electrodes | Defective plating | Defective chip bonding | Reliability (high temperature IR) |
|---|---|---|---|---|---|---|
| | 1.0 μm or greater (parts by weight) | 0.3 μm or less (parts by weight) | | | | |
| Comparative Example 3 | 100 | 0 | 12/100 | 0/200 | 2/10000 | 0/40 |
| Embodiment Example 5 | 90 | 10 | 0/100 | 0/200 | 0/10000 | 0/40 |
| Embodiment Example 6 | 75 | 25 | 0/100 | 0/200 | 0/10000 | 0/40 |
| Embodiment Example 7 | 50 | 50 | 0/100 | 0/200 | 0/10000 | 0/40 |
| Embodiment Example 8 | 25 | 75 | 0/100 | 0/200 | 0/10000 | 0/40 |
| Embodiment Example 9 | 10 | 90 | 0/100 | 0/200 | 0/10000 | 0/40 |
| Comparative Example 4 | 0 | 100 | 0/100 | 3/200 | 368/10000 | 0/40 |

With reference to Table 2, Comparative Example 3 includes 100 parts by weight of metal particles having an average particle diameter of 1.0 μm or greater. It can be seen that connectivity between the ceramic main body and the external electrodes was defective, such that capacitance may not be generated.

Comparative Example 4 includes 100 parts by weight of metal particles having an average particle diameter of 0.3 μm or less. It can be seen that plating and chip bonding were defective.

Meanwhile, Embodiment Examples 5 through 9 satisfied the range of numerical values according to the present invention. It can be seen that Embodiment Examples 5 through 9 had favorable results in the tests of connectivity between the ceramic main body and the external electrodes, defective plating, defective chip bonding, and reliability.

In the following Table 3, reliability, defective plating, capacity contact were compared according to the area occupied by the glass in the area of the central area portions when the external electrodes were divided into three equal parts in a thickness direction.

TABLE 3

| | Area occupied by glass in area of central area portions (%) | Reliability (number of defective samples/total number of samples) | Defective plating (number of defective samples/total number of samples) | Capacity contact (number of defective samples/total number of samples) |
|---|---|---|---|---|
| Comparative Example 5 | 20 | 8/40 | 0/2000 | 0/200 |
| Comparative Example 6 | 25 | 2/40 | 0/2000 | 0/200 |
| Comparative Example 7 | 30 | 2/40 | 0/2000 | 0/200 |
| Embodiment Example 10 | 35 | 0/40 | 0/2000 | 0/200 |
| Embodiment Example 11 | 40 | 0/40 | 0/2000 | 0/200 |
| Embodiment Example 12 | 50 | 0/40 | 0/2000 | 0/200 |
| Embodiment Example 13 | 60 | 0/40 | 0/2000 | 0/200 |
| Embodiment Example 14 | 70 | 0/40 | 0/2000 | 0/200 |
| Embodiment Example 15 | 80 | 0/40 | 0/2000 | 0/200 |
| Comparative Example 8 | 85 | 0/40 | 8/2000 | 2/200 |
| Comparative Example 9 | 90 | 0/40 | 184/2000 | 136/200 |

With reference to Table 3, it can be seen that reliability was degraded due to the increase in the insulation resistance when the areas of the glass in central area portions thereof were 20%, 25%, and 30% of the total areas of the central area portions.

Also, it can be seen that plating and capacity contact were defective when the areas of the glass in central area portions thereof were 85% and 90% of the total areas of the central area portions.

Meanwhile, it can be seen that when the areas of the glass in central area portions thereof were 35% to 80% of the total areas of the central area portions, favorable results were obtained in the tests on capacity contact according to connectivity between the ceramic main body and the external electrodes, defective plating, and reliability.

In conclusion, according to an embodiment of the present invention, a multilayer ceramic electronic component having excellent connectivity between the ceramic main body and the external electrodes and high reliability without defective plating or defective chip bonding may be implemented.

That is, the multilayer ceramic electronic component having improved reliability may be implemented by enhancing chip air-tightness.

Figure 6:
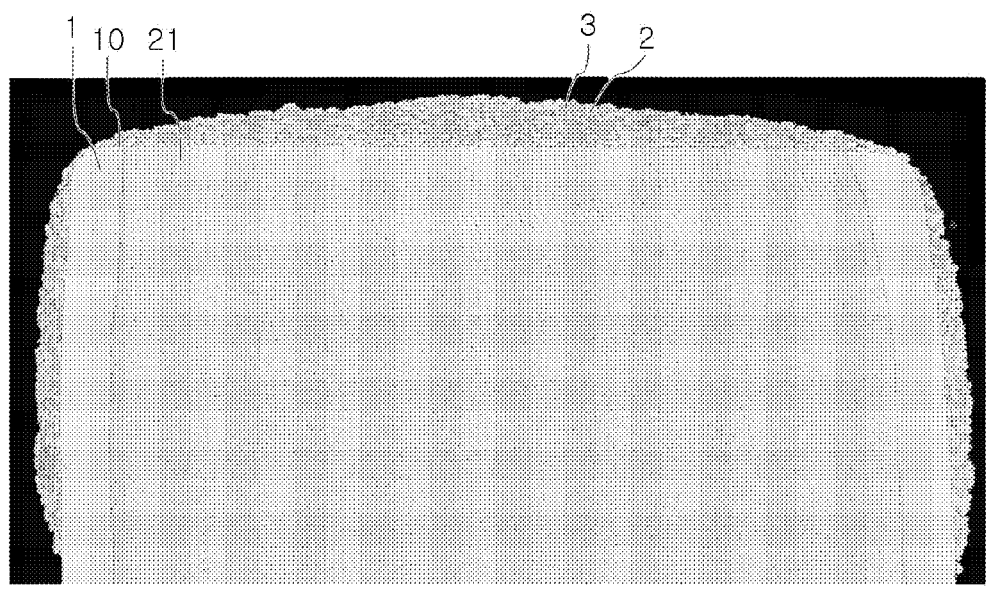
FIG. 6 is a scanning electron microscope (SEM) photograph of the section of a multilayer ceramic capacitor according to an embodiment of the present invention.

FIG. 6 is a scanning electron microscope (SEM) photograph of the section of a multilayer ceramic capacitor according to an embodiment of the present invention.

With reference to FIG. 4, it can be seen that the content of the glass 3 over the conductive metal 2 in the section of the external electrodes of the MLCC according to an embodiment of the present invention was extremely increased, enhancing air-tightness of the chip to obtain excellent reliability.

In addition, it can be seen that the glass 3 was uniformly distributed within at least one of the first and second external electrodes.

As set forth above, according to embodiments of the invention, the external electrodes are formed by using an external electrode paste having an increased content of glass, whereby a multilayer ceramic electronic component having improved reliability may be implemented by enhancing chip air-tightness.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component comprising:
a ceramic main body including a dielectric layer and having first and second main faces opposed in a lamination direction of the dielectric layer, third and fourth side faces connecting the first and second main faces and opposed in a length direction, and fifth and sixth faces connecting the first and second main faces and opposed in a width direction;
first and second internal electrodes disposed to face each other, while having the dielectric layer interposed therebetween within the ceramic main body; and
one or more first external electrodes formed on the fifth face and electrically connected to the first internal electrodes and one or more second external electrodes formed on the sixth face and electrically connected to the second internal electrodes,
wherein the first and second external electrodes include a conductive metal and glass and have an average thickness ranging from 3 μm to 30 μm, and when at least one of the first and second external electrodes is divided into three equal parts in a thickness direction, an area of glass in central area portions thereof is 35% to 80% of the total areas of the central area portions,
wherein a ratio of the content of the glass to that of the conductive metal ranges from 0.4 to 2.0.

2. The multilayer ceramic electronic component of claim 1, wherein the first and second external electrodes are formed through an application of a paste including 10 to 90 parts by weight of conductive metal particles having an average particle diameter of 0.3 μm or less.

3. The multilayer ceramic electronic component of claim 1, wherein the conductive metal is one or more selected from a group consisting of copper (Cu), nickel (Ni), silver (Ag), and silver-palladium (Ag—Pd).

4. The multilayer ceramic electronic component of claim 1, wherein the first and second external electrodes extend onto the first and second main faces, respectively.

5. The multilayer ceramic electronic component of claim 1, wherein two first external electrodes and two second external electrodes are provided.

6. The multilayer ceramic electronic component of claim 1, wherein the first and second external electrodes are four or more multiple terminals.

7. The multilayer ceramic electronic component of claim 1, wherein the first and second external electrodes are three terminals including a single first external electrode, a single second external electrode, and third external electrodes formed to face each other on the third and fourth side faces.

8. The multilayer ceramic electronic component of claim 1, wherein an average thickness of the first and second external electrodes is 5 μm or more.

9. The multilayer ceramic electronic component of claim 1, wherein the glass included in the first and second external electrodes is an insulating glass.

* * * * *